United States Patent [19]

Friehauf et al.

[11] Patent Number: 4,636,892
[45] Date of Patent: Jan. 13, 1987

[54] FLEXIBLE DISK DRIVE OPTIMIZED FOR AUTOMATED MANUFACTURE

[75] Inventors: William J. Friehauf, Thornton; Donovan M. Janssen; Alan J. Kirton, both of Boulder; Robert M. Murphy, Longmont; Leroy Rose, Boulder, all of Colo.

[73] Assignee: International Business Machines Corporation, Armonk, N.Y.

[21] Appl. No.: 628,044

[22] Filed: Jul. 5, 1984

[51] Int. Cl.⁴ ............................................. G11B 5/012
[52] U.S. Cl. .................................... 360/97; 360/137
[58] Field of Search ................................ 360/97–99, 360/137

[56] References Cited

U.S. PATENT DOCUMENTS

| | | | |
|---|---|---|---|
| 4,040,106 | 8/1977 | Medley | 360/99 |
| 4,139,877 | 2/1979 | Townsend | 360/106 |
| 4,523,240 | 6/1985 | Dunstan et al. | 360/99 |
| 4,539,613 | 9/1985 | Suyama et al. | 360/99 |

OTHER PUBLICATIONS

"Magnetic Disk Drive", by J. J. Holecek et al., IBM Technical Disclosure Bulletin, vol. 22, No. 10, Mar. 1980, pp. 4657–4660.

*Primary Examiner*—John H. Wolff
*Attorney, Agent, or Firm*—Robert E. Harris

[57] ABSTRACT

A flexible disk drive is disclosed that is optimized for automated manufacture. The critical elements of the disk drive are divided into two functional groups, one of which includes the elements for loading and unloading the disk cartridge and the other of which includes the elements for reading and writing on the flexible disk within the cartridge, with the elements of each group being precisely registered with respect to one another on separate frame members. The frame members are coarsely registered with respect to one another and snapped together, after separate assembly of at least most of the elements on the separate frame members has been completed, and fine position registration of the flexible disk to the spindle is thereafter achieved during each loading operation of a flexible disk into the assembly disk drive by collet centering and clamping the disk to the spindle. By this arrangement, automated methods of manufacture can be effectively carried out for assembly of each frame member as well as final assembly of the frame members.

20 Claims, 6 Drawing Figures

FLEXIBLE DISK DRIVE OPTIMIZED FOR AUTOMATED MANUFACTURE

FIELD OF THE INVENTION

This invention relates to a flexible disk drive, and, more particularly, relates to a flexible disk drive that can be assembled by automated manufacturing techniques.

BACKGROUND OF THE INVENTION

Flexible, or floppy disk, drives are well known in the data processing industry, and are presently widely utilized as a primary peripheral input/output device for personal computers. In this application, the drives typically use a flexible five and one-fourth inch disk contained within a flexible cartridge, or envelope.

To lower the cost of flexible disk drives, it is desirable that the drives be assembled on an automated manufacturing line having robotic arms. To accomplish this, the disk drive must be designed for ease of assembly, but nevertheless must have precise registration between key elements of the assembled drive to ensure that recorded disks may be interchanged between drives.

Modularization of some assemblies in flexible disk drives is known. An example is the disk drive described in U.S. Pat. No. 4,139,877 issued to R. H. Townsend. While the modularization techniques as shown in this patent make it easier to assemble or interchange subassemblies in flexible disk drives, the drive is still relatively complex and is felt not to lend itself to robotic assembly.

Splitting the elements of a disk drive into critical and not critical groupings is taught in an article entitled "Magnetic Disk Drive Machine" by J. J. Holecek et al (IBM Technical Disclosure Bulletin, Volume 22, Number 10, March, 1980, pages 4657-4660). All of the elements of the disk drive that require precise position registration are placed on one frame, and a second frame, carrying the elements of the disk drive that have a larger position tolerance, is bolted to the first frame. While the technique taught in the Holecek et al publication could be used to assist automated assembly, it is not usually possible to place all critical elements of the drive on one frame and/or constitutes a design constraint.

SUMMARY OF THE INVENTION

This invention provides a flexible disk drive that lends itself to automated manufacture while not requiring that all critical elements be placed on one frame member. Instead, in this invention, the critical elements are grouped by function and assembled on different frame members with the assembled frame members being then snapped together to complete the drive assembly.

It is therefore an object of this invention to provide a flexible disk drive optimized for automated manufacture by functionally grouping critical elements and separately assembling such elements on different frame members prior to completing the assembly of the drive which includes snapping the assembled frame members together.

With these and other objects in view, which will become apparent to one skilled in the art as the description proceeds, this invention resides in the novel construction, combination, arrangement of parts and method as hereinafter described and more particularly defined by the appended claims, it being understood that changes are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

In this invention, the critical elements of the drive are divided into two functional groups, the first of which includes the elements for loading or unloading the disk cartridge, and the second of which includes the elements for reading or writing on the flexible disk within the cartridge. The elements of each group are assembled with the elements of one group being precisely registered with respect to one another on a first frame member and the elements of the second group being precisely registered with respect to one another on a second frame member, and each functional group may be designed for robotic assembly on the frame member. The two frame members are then coarsely registered with respect to one another and snapped together during final assembly of the drive, and this operation may also be designed for robotic assembly.

In the preferred embodiment as set forth hereinafter, the disk spindle drive, the recording head and the track access assembly (used to move the carriage) are all precisely positioned on the lower, or main, frame member, while the disk carriage load/unload mechanism (including the carriage insertion guides and stops) the collet (for clamping the disk to the spindle), and the actuating mechanism (for the collet, cleaning pad and upper recording head) are all precisely positioned on the upper frame member (which may be referred to as a top plate).

Coarse position registration of the frame members is provided by the relative positioning of the elements of the two frames when snapped together, which positioning is augmented by guide pins in one member received in apertures in the other member. Fine position registration of the flexible disk to the spindle is provided by the collet centering and clamping the disk to the spindle during each loading operation of the disk cartridge into the drive.

A particular advantage of this invention is that robots can assemble the two different functional groups of elements on the two different frame members, with the robots operating on each side of each frame member, after which the frame members are snapped together during final assembly while maintaining the positional integrity of the elements within each functional group and achieving sufficient coarse position relationship between the elements of the two groups so that precise registration of the spindle to the disk can be thereafter readily achieved during each loading operation of the disk into the drive.

Figure 1:
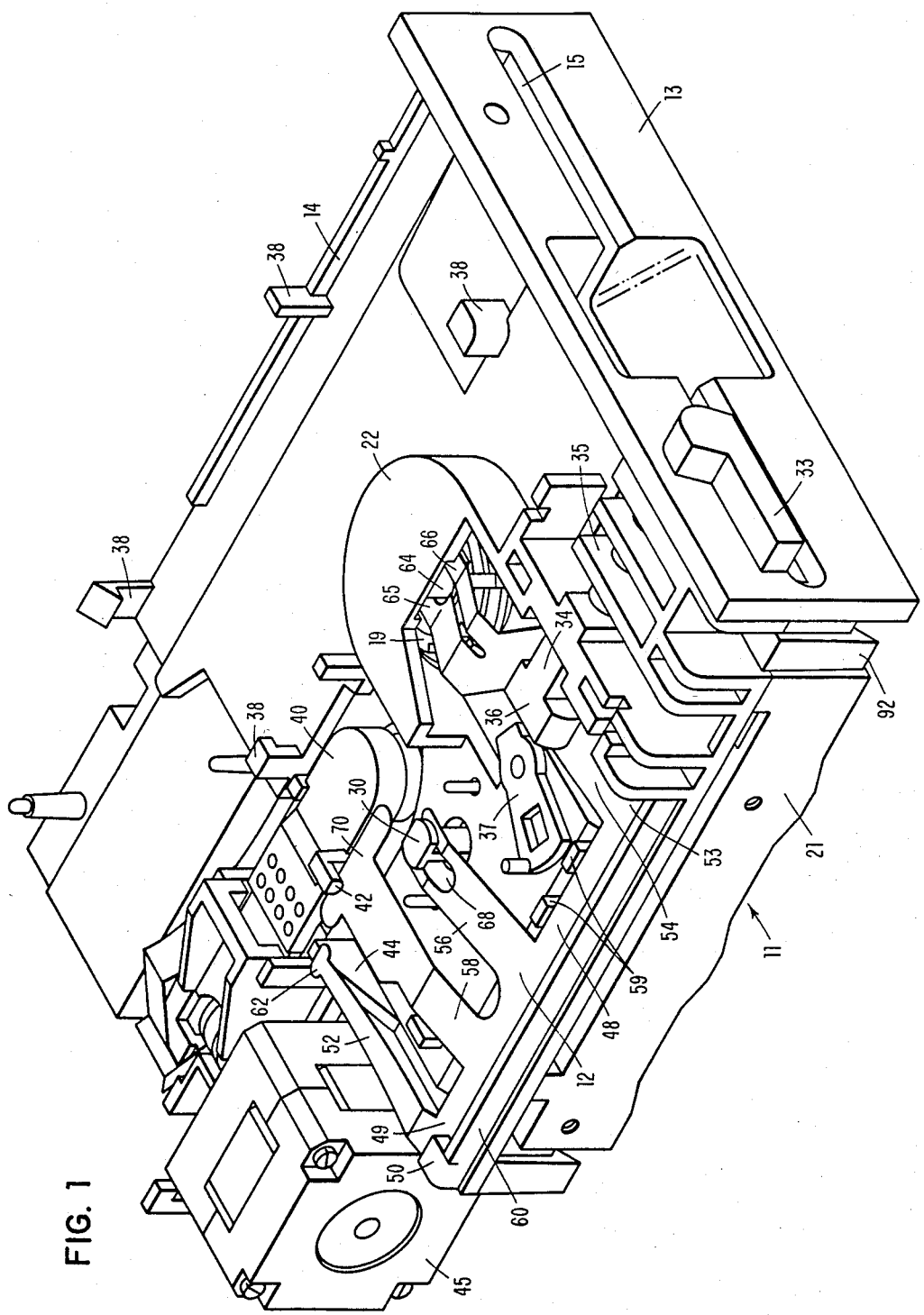
FIG. 1 is a perspective view of an assembled disk drive with the logic card removed from the top plate.

A flexible drive, such as flexible drive 11 as shown in FIG. 1, may be assembled using the techniques of this invention. It is to be realized, however, that while the flexible drive particularly shown herein is a half-high five and one-fourth inch diskette drive, as is typically used in a personal computer, this drive is for purposes of illustration only and other flexible drives could likewise be assembled using the techniques of this invention.

As shown, flexible disk drive 11 (which is shown in FIG. 1 without a logic card for purposes of illustrating the elements of the drive) includes an actuator 12 and a front panel 13 connected with top plate 14, with the front panel having an access slot 15 therein through which the disk envelope, with the floppy disk therein, may be inserted into passage 16 of drive 11 below top plate 14. Passage 16 (see FIG. 3) within the drive must allow free movement of the disk envelope rearwardly and forwardly during insertion and removal, respectively, of the envelope into the drive, but must also coarsely position an inserted disk envelope, which positioning is carried out by guides 17 at the opposite sides of passage 16 and rear stops 18.

It is also necessary that the floppy disk within the envelope in the disk drive be precisely positioned for proper operation, and this is accomplished by collet 19, in conjunction with spindle 20 (see FIGS. 3 and 5), during loading, as is brought out more fully hereinafter.

Figure 3:
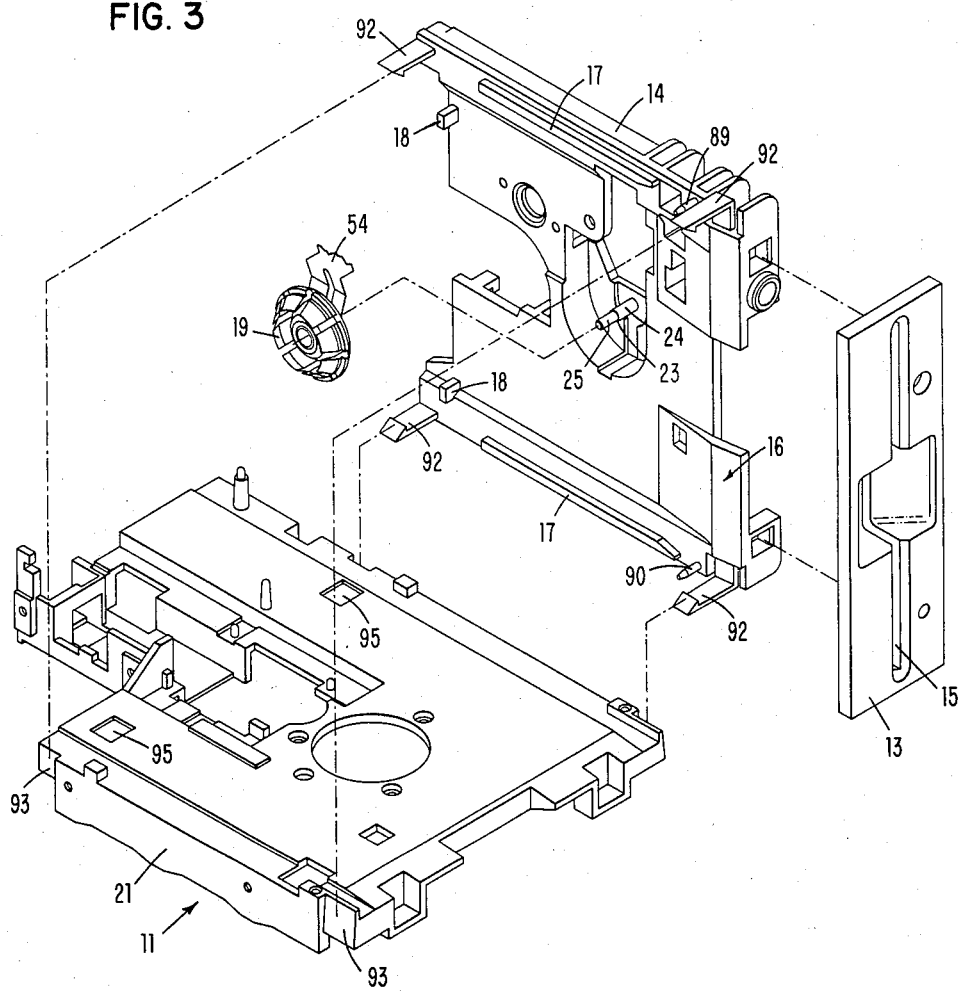
FIG. 3 is an exploded view of the main frame, the top plate and front panel, with the underside of the top plate illustrating the diskette cartridge loading guides, rear stops and collet shaft registered in position with respect to each other on the top plate.
Figure 4:
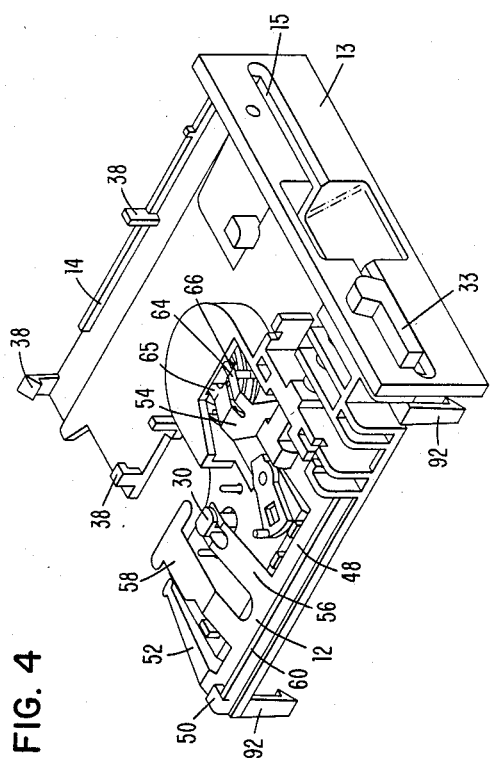
FIG. 4 is a perspective view of the assembled top frame.
Figure 5:
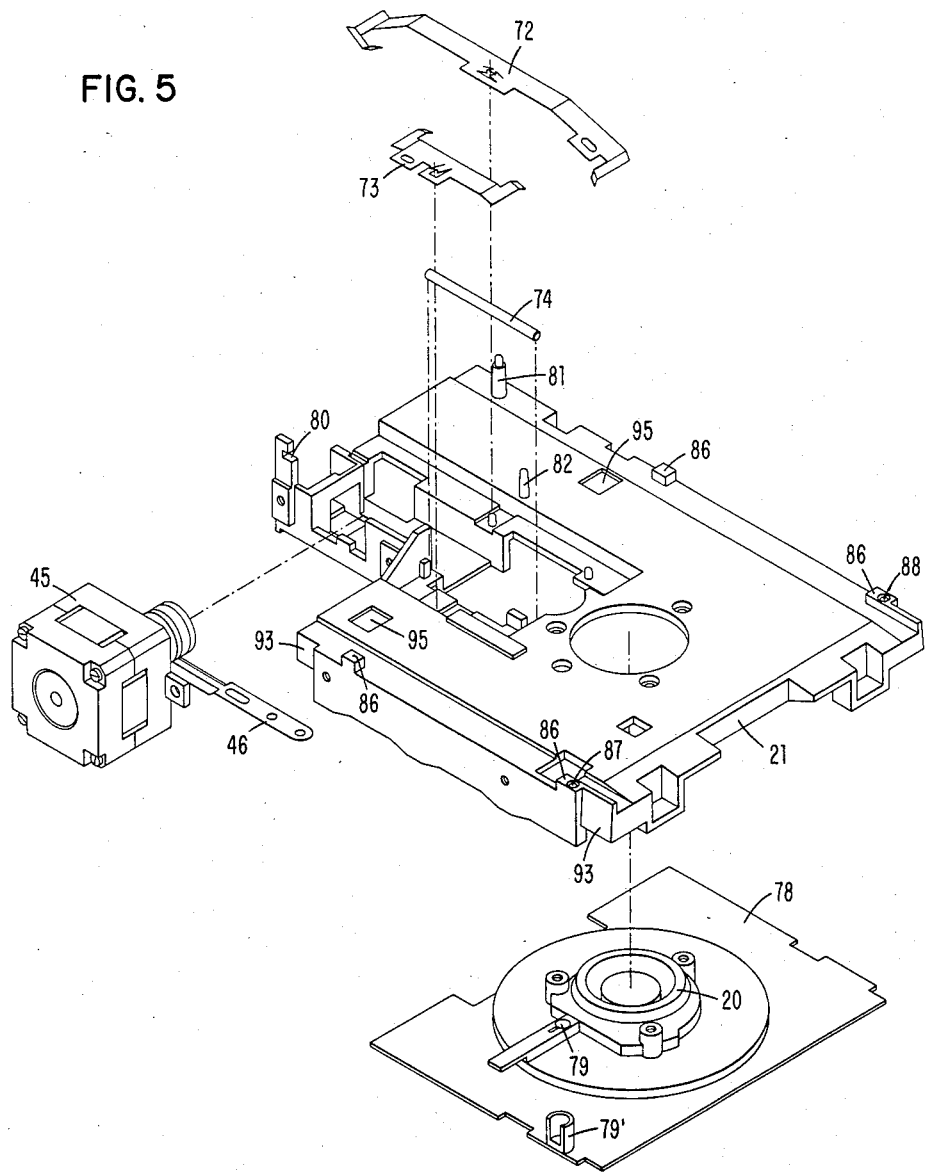
FIG. 5 is an exploded perspective view of the lower frame.
Figure 6:
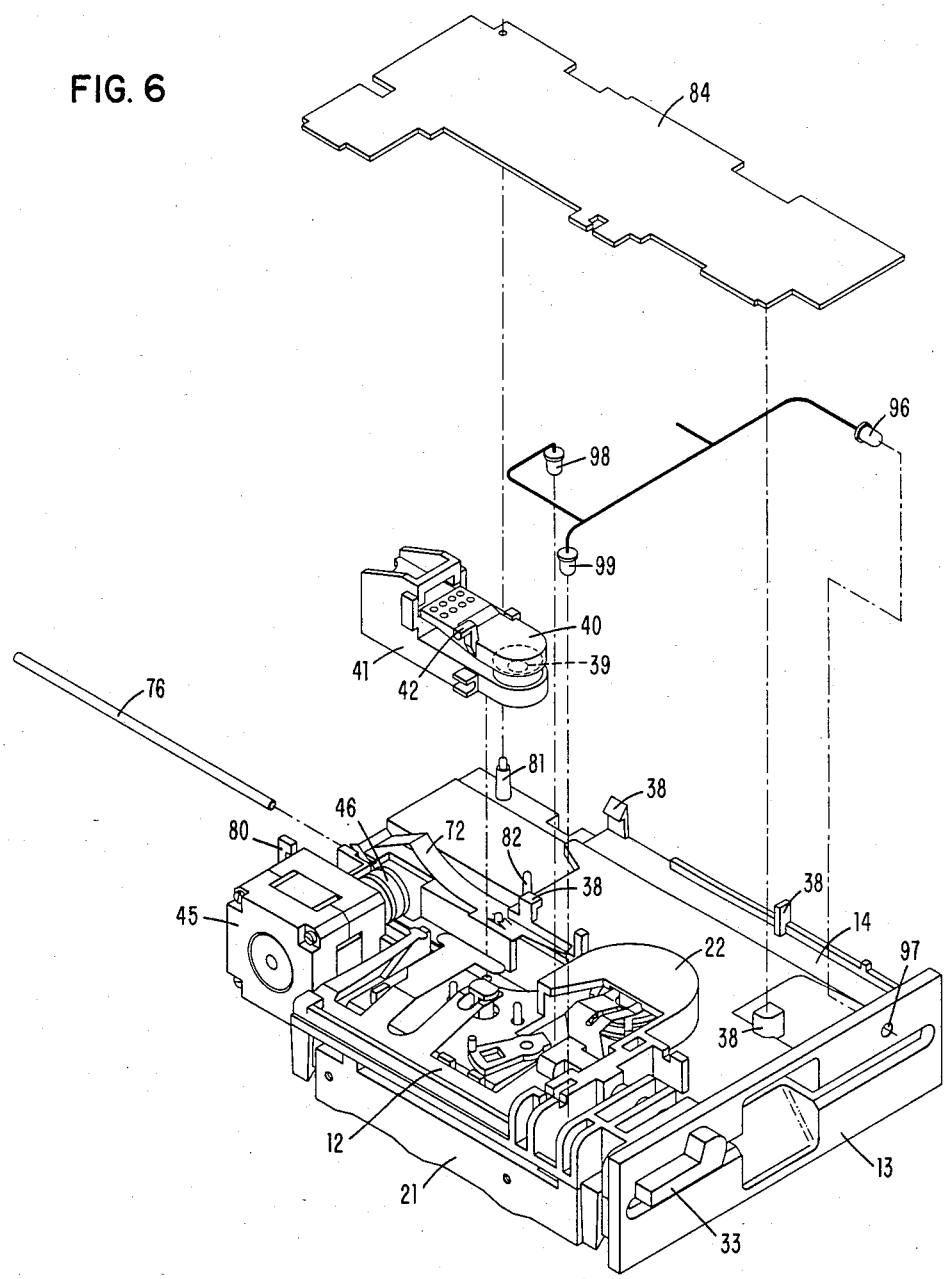
FIG. 6 is a perspective view of the top frame snapped to the lower frame and including an exploded view of the carriage and logic card to be added during final assembly.

As shown in FIGS. 1 through 4, the critical elements for loading and unloading of the flexible disk drive are positioned, or mounted, on top plate, or upper frame member 14, while the critical elements for reading and writing on flexible disks loaded into the flexible disk drive are positioned, or mounted, on lower, or main, frame member 21, as shown in FIGS. 5 and 6.

Collet 19 is mounted under raised portion 22 of top plate 14 on downwardly extending collet shaft 23 (having a larger diameter inner, or upper, portion 24 and a smaller diameter outer, or lower, portion 25) by collet pin 26 so that collet 19 is received in spindle 20 through the central aperture of a flexible disk within passage 16 during each loading operation.

Pressure pad 28 is also mounted at top plate 14 and includes a pin 29 having a head 30 at the top that extends upwardly above the top panel when assembled, a foot 31 at the bottom that extends into passage 16, and a spring 32 between foot 31 and the bottom of top plate 14 to bias the pressure pad downwardly toward the surface of a disk within passage 16.

A cam actuating handle 33 is mounted at the front end of shaft 34 just forwardly of front panel 13. Shaft 34 is rotatably mounted in vertical ribs 35 of top plate 14 and extends through an aperture in front panel 13 to receive handle 33. A cam 36 (preferably formed as a single piece with shaft 34) is mounted at the rear end of shaft 34 so that rotation of handle 33 controls cam actuation. In addition, a mounting bracket 37 is mounted on top plate 14 rearwardly of cam 36 for mounting a photodiode thereon for indexing purposes, and logic card positioning and/or restraining ears 38 are also provided for positioning the logic card (shown in FIG. 6).

Recording head 39 (see FIG. 6) is mounted on recording head arm 40, and arm 40 is pivoted on head carriage 41. An upwardly and outwardly extending finger 42 is mounted on recording head arm 40, and main frame 21 has an upwardly extending shoulder 44 at one side of carriage 41. Carriage 41 is mounted on main frame 21 so as to be constrained to forward and rearward movement with respect to the main frame, with such movement being controlled by stepping motor 45 through band and tensioner assembly 46, with motor 45 being also mounted on main frame 21. Stepping motor 45, in connection with band and tensioner assembly 46, steps head carriage 41 along a radial line of a flexible disk within passage 16 to maintain the recording head (upper or lower) on head carriage 41 aligned with the desired track on the disk.

Lifting and lowering of the collet, recording head arm and pressure pad are enabled through use of actuator 12, which actuator is a torsional actuator that is a single flat spring structure. Actuator 12 includes a torsion beam 48 that engages the upper side of top plate 14. One end 49 of torsion beam 48 is received under lip 50 of top plate 14 and has a preload biasing, or lifting, arm 52 extending therefrom, while the other end 53 of torsion beam 48 has a collet actuating, or lifting, arm 54 extending therefrom. A pressure pad actuating, or lifting, arm 56 and a recording head actuating, or lifting, arm 58 extend from the middle portion of the torsion beam with the middle portion being restrained against movement by ears 59 and side rail 60. The torsion beam and all of the lifting arms of the actuator are bendable beams which are preferably constructed of thin metal, such as stainless steel, to form a unitary flat spring.

The free end 62 of preload biasing arm 52 engages the top of shoulder 44 to provide a bias to the actuator when the device is in the assembled condition. Collet actuating arm 54 has a V-shaped portion 63 for adaption of the arm to the collet, and a notch 64, formed from legs 65 and 66, extends inwardly from the end of the arm so that collet pin 26 is received in the notch.

While a uniform notch 64 could be utilized, it has been found that media slip can be avoided, at least in some disk drives, by configuring notch 64 off-center, as shown best in FIG. 4. By use of an off-center notch, such as is shown in FIG. 4, the force balance is changed between legs 65 and 66 such that they exert equal force on the collet pin and thus avoid a force imbalance, which could cause the collet to precess relative to the spindle and thus cause media slip.

Pressure pad actuating arm 56 also has an inwardly directed notch 68 at the free end to receive pin 29 of pressure pad 28 therein. The free end of recording head actuating arm 58 has a T-shaped portion 70 thereat, which T-shaped portion is received below finger 42 of recording arm 40, which finger is above the top of the recording head actuating arm.

The arms of actuator 12 are configured as needed to accomplish the desired end. Thus, preload bias arm 52 is deflected with respect to the other arms to provide a preload bias to the torsion beam, while the actuating arms are selectively bent to control the sequence of loading the collet, the cleaning liner (through the pressure pad), and the recording head (through the recording head arm) onto a disk within the disk drive, and the configuration of the collet actuating arm determines the load force exerted on the collet when loaded.

Figure 2:
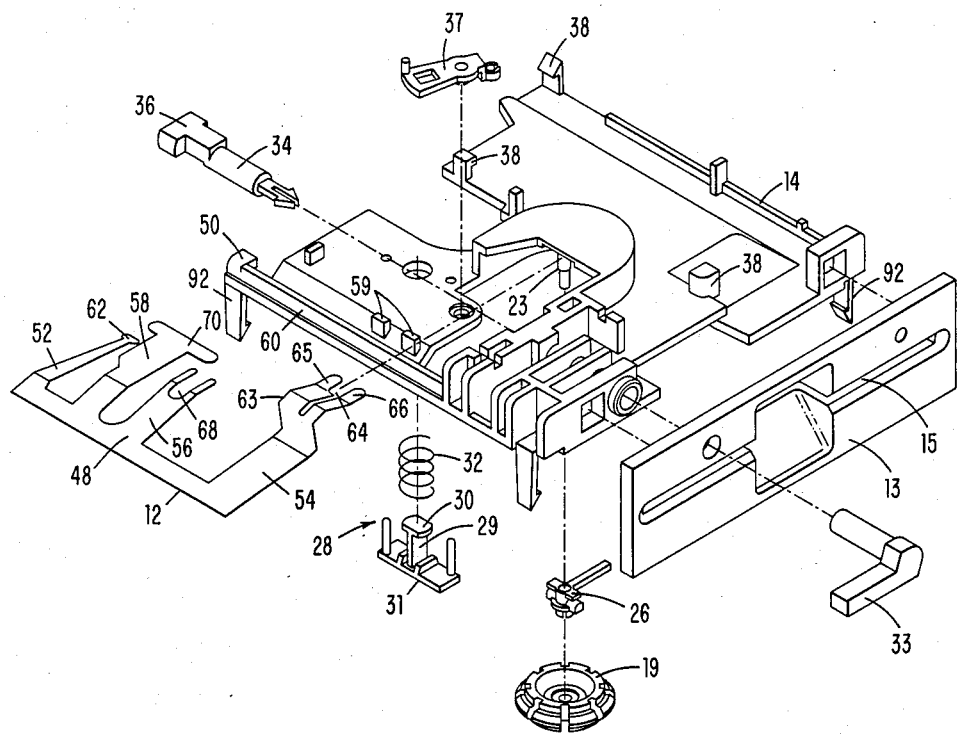
FIG. 2 is an exploded perspective view of the top frame illustrating mounting of the loading and unloading elements therein.

As best shown in FIGS. 2 and 3, the elements for loading and unloading of the disk cartridge are assembled on top cover (or upper frame) 14. As shown, this includes actuator 12, cam assembly 33-36, pressure pad 28, collet 19, and front plate 13 which includes access slot 15 for allowing insertion of a disk cartridge into the drive (the positioning of the disk cartridge is controlled by guides 17 and rear stops 18 on the underside of the top cover, as shown in FIG. 3. As can be appreciated from FIG. 2, the various elements are snapped in place or to one another.

As shown in FIGS. 5 and 6, the elements for reading and writing on a disk within the drive are mounted on lower frame 21. As shown, this includes the stepping motor 45, band and tensioner assembly 46, carriage 41 (having the recording arm 40 and recording head 39 thereon) and the motor spindle 20.

As shown in FIG. 5, carriage track assembly 46 includes clips 72 and 73, with guiding being accomplished by guide rod 74 (held by clip 73) at one side of the carriage track and by guide rod 76 (restrained by clip 72) which is inserted at the other side of the carriage track when the carriage is positioned on the main frame (as indicated in FIG. 6). As also indicated in FIG. 5, a logic card 78 (with no specific electronics shown) is provided at spindle 20, as is an index LED 79 and a write protect LED 79'. A notch 80 and card posts 81 and 82 are provided at the rear portion of main frame 21 to support the back section of logic card 84, which logic card provides electronic interfacing for the drive and is shown in FIG. 6 without specific electronics.

In addition, top plate supports 86 are provided on main frame 21, as is guide pin aperture 87 and guide pin slot 88 which receive guide pins 89 and 90 (see FIG. 3). These pins are utilized for coarse registrations when the frame members are snapped together.

The frame members are snapped together by snapping ears 92 at the four corners of the top cover with the ears mating with receiving detents 93 in the four corners of the main frame. It should also be noted that the rear stops 18 extend through pockets 95 in the main frame and cartridge guide 17 also extend below the top surface of passage 16 provided by the main frame to assure that the cartridge cannot slip thereunder.

After assembly of the stepping motor, carriage track assembly and spindle to the lower frame, the top frame is snapped to the lower frame.

As shown in FIG. 6, after the frame members have been snapped together, carriage 41 is mounted on the lower frame member and connected with the band and tensioner assembly so that the carriage is moved by stepping motor 45. In addition, LED 96 is also provided and mounted in front panel 13 at aperture 97 as an activity light and photodiodes 98 and 99 are provided in top plate 14 for index and write protection. The assembly is then completed by placing logic card 84 over the top plate as indicated in FIG. 6.

In operation, the assembly of each frame member is individually carried out, preferably by robotic arms, after which the frame members are snapped together during final assembly. After final assembly, the drive is ready for use by loading a disk cartridge into the drive and then using the disk within the cartridge for reading or writing magnetic signals thereon.

As can be appreciated from the foregoing, this invention provides a flexible disk drive that is optimized for automated manufacture by functional grouping of elements and mounting of each functional group on a separate frame member prior to snapping the frame members together during final assembly.

What is claimed is:

1. A flexible disk drive having functional element grouping, said disk drive comprising:
    a first frame member;
    a first functional element group including a first plurality of elements for loading and unloading a disk into said disk drive, said first plurality of elements being mounted on said first frame member;
    a second frame member;
    a second functional element group including a second plurality of elements for reading and writing on a disk when loaded in said disk drive, said second plurality of elements being mounted on said second frame member; and
    cooperating coarse registration and fastening means on said first and second frame members for releasably securing said frame members together whereby said second plurality of elements can thereafter read and write on a disk loaded into said disk drive by said first plurality of elements.

2. The disk drive of claim 1 wherein said first frame member is an upper frame member, and wherein said first plurality of elements includes a collet and collet actuating means.

3. The disk drive of claim 2 wherein said first plurality of elements also includes a recording head actuating arm and a pressure pad actuating arm.

4. The disk drive of claim 1 wherein said second frame member is a lower frame member, and wherein said second plurality of elements includes a spindle drive, a recording and reading assembly, and a recording and reading assembly control.

5. The disk drive of claim 1 wherein said coarse registration and cooperating fastening means includes snap fastening means and detent means.

6. The disk drive of claim 5 wherein said snap fastening means is mounted on the edge portions of said upper frame member, and said detent means is formed at the edge portions of said lower frame member.

7. The disk drive of claim 1 wherein said first and second plurality of elements are arranged for automated robotic manufacture.

8. A flexible disk drive having functional element groupings, said disk drive comprising:
    a lower frame member;
    a spindle mounted on said lower frame member;
    a carriage having a recording arm with a recording head thereon, said carriage being mounted on said lower frame member;
    carriage control means for controlling radial movement of said recording head with respect to a flexible disk operatively positioned in an assembled disk drive, said carriage control means being mounted on said lower frame member;
    an upper frame member;
    guide and stop means mounted on said upper frame member for operatively positioning a disk cartridge having a flexible disk therein;
    a collet mounted on said upper frame member;
    collet actuating means mounted on said upper frame member for moving said collet between a loaded position and an unloaded position;
    recording arm actuating means mounted on said upper frame member for enabling movement of said recording head arm between a loaded position and an unloaded position;

actuating arm control means mounted on said upper frame member for causing movement of said actuating means in one direction to enable said collet and recording arm to assume said loaded position, and in another direction to enable said collet and recording arm to assume said unloaded position; and cooperating coarse registration and fastening means mounted on said upper and lower frame members to releasably secure said frame members together in an assembled disk drive with said collet at least coarsely aligned with said spindle.

9. The disk drive of claim 8 wherein said disk drive includes a pressure pad movable between loaded and unloaded positions, and a pressure pad actuating arm, said pressure pad and said pressure pad actuating arm being mounted on said upper frame member, and said pressure pad actuating arm being controlled by said actuating arm control means to enable said pressure pad to assume said loaded and unloaded position.

10. The disk drive of claim 8 wherein said coarse registration and fastening means includes guide pin means on one of said upper and lower frame members and receiving means on the other of said upper and lower frame members for receiving said guide means as said upper and lower frame members are fastened together to assure coarse positioning between the elements of each frame member with respect to the elements of the other frame members.

11. The disk drive of claim 10 wherein said upper and lower frame members and said elements to be mounted thereon are adapted for assembly by robots.

12. A method for assembling a flexible disk drive, said method comprising:
providing upper and lower frame members;
grouping critical elements of the disk drive into a first functional group related to loading and unloading of a flexible disk into and from the disk drive, and a second functional group related to reading and writing on a flexible disk loaded into the disk drive;
mounting the elements of said first group of elements on said upper frame member and the elements of said second group on said lower frame member; and
coarsely aligning and securing said upper and lower frame members to one another so that coarse alignment is obtained between cooperating elements of said first and second group of elements.

13. The method of claim 12 wherein said method includes providing a collet, a collet actuating arm for moving said collet between the loaded and unloaded positions, and a spindle that receives said collet when said collet is moved to said loaded position, and wherein said grouping of said elements includes placing said collet and said collet actuating arm in said first group and placing said spindle in said second group.

14. The method of claim 13 wherein said method includes providing a cam actuator for moving said collet between said loaded and unloaded positions, and wherein said grouping of said elements includes placing said cam actuator in said first group.

15. The method of claim 12 wherein said method includes providing a recording head, a recording head arm, and an actuating arm for said recording head arm, and wherein said grouping of said elements includes placing said actuating arm for said recording head arm in said first group, and placing said recording head and recording head arm in said second group.

16. The method of claim 12 wherein said method includes providing a pressure pad and a pressure pad actuating arm for enabling said pressure pad to be loaded against a disk in an assembled disk drive, and wherein said grouping of said elements include placing said pressure pad actuating arm in said first group.

17. The method of claim 12 wherein said upper and lower frame members are releasably secured together.

18. A method for assembling a disk drive, said method comprising:
providing an upper frame member with a front panel having a disk cartridge access therein;
providing cartridge positioning guides and stops on said upper frame member to operatively position a cartridge inserted in the disk drive through said disk cartridge access in the front panel;
mounting a collet, pressure pad, actuating spring and cam actuator on said upper frame so that said cam actutor enables positioning of said collet and pressure pad between loaded and unloaded positions through said actuating spring;
providing a lower frame member;
mounting a spindle and recording arm control assembly on said lower frame member;
coarsely aligning and releasably securing said upper frame member to said lower frame member so that said collet is at least coarsely aligned with said spindle; and
mounting a carriage assembly that enables a recording arm with a recording head thereon on said lower frame member so that said cam actuator enables said recording head to be moved between loaded and unloaded positions through said actuating spring.

19. The method of claim 18 wherein said collet, pressure pad, actuating spring and cam actuator are releasably mounted on said upper frame member by being snapped into position, and wherein said upper and lower frame members are releasably secured to one another by snapping the frame members together.

20. The method of claim 18 wherein said cartridge positioning guides and stops are integrally formed on said upper frame member, wherein said collet, pressure pad, actuating spring, and cam actutaor are mounted on said upper frame member by robotic assembly, wherein said spindle, recording arm control assembly and carriage assembly are mounted on said lower frame member by robotic assembly, and wherein said frame members are secured to one another by robotic assembly.

* * * * *